US012751431B2

(12) United States Patent
Bae

(10) Patent No.: US 12,751,431 B2
(45) Date of Patent: Oct. 6, 2026

(54) INCUBATING DEVICE

(71) Applicant: AUTO ELEX CO. LTD., Gimhae-si (KR)

(72) Inventor: Jong Yoon Bae, Gimhae-si (KR)

(73) Assignee: AUTO ELEX CO. LTD., Gimhae-si (KR)

(*) Notice: Subject to any disclaimer, the term of this patent is extended or adjusted under 35 U.S.C. 154(b) by 136 days.

(21) Appl. No.: 18/718,050

(22) PCT Filed: Nov. 18, 2022

(86) PCT No.: PCT/KR2022/018283

§ 371 (c)(1),
(2) Date: Jun. 9, 2024

(87) PCT Pub. No.: WO2023/106684

PCT Pub. Date: Jun. 15, 2023

(65) Prior Publication Data

US 2025/0081944 A1 Mar. 13, 2025

(30) Foreign Application Priority Data

Dec. 10, 2021 (KR) ........................ 10-2021-0176639
Sep. 8, 2022 (KR) ........................ 10-2022-0114204

(51) Int. Cl.
*A01K 41/04* (2006.01)
*A01K 41/02* (2006.01)
*A01K 41/06* (2006.01)

(52) U.S. Cl.
CPC ............ *A01K 41/04* (2013.01); *A01K 41/026* (2013.01); *A01K 41/06* (2013.01)

(58) Field of Classification Search
CPC ....... A01K 41/06; A01K 41/026; A01K 41/04
See application file for complete search history.

(56) References Cited

U.S. PATENT DOCUMENTS 1,930,967 A * 10/1933 Davidson ............... A01K 41/00 119/325
5,792,427 A * 8/1998 Hugh ...................... E06B 7/231 55/467

(Continued)

FOREIGN PATENT DOCUMENTS

KR 1020020086454 11/2002
KR 1020160003416 1/2016

(Continued)

OTHER PUBLICATIONS

Translation of WO 2011093607 A2 (Year: 2011).*

(Continued)

*Primary Examiner* — Timothy D Collins
*Assistant Examiner* — Brittany A Lowery
(74) *Attorney, Agent, or Firm* — Ferguson Case Orr Paterson

(57) ABSTRACT

The present invention relates to an incubating device. The incubating device according to an aspect of the present invention is characterized by comprising: a housing which has a certain space therein and of which one surface may be open or closed; one or more plate parts which are provided inside the housing and on which objects are placed; a support part which supports one end of each of the plate parts and is provided with an egg turning gear for transmitting rotational force to the plate parts; a device driving part provided with an egg turning drive portion that is mounted in engagement with the egg turning gear to rotate the plate parts; and a controller that manipulates and controls the device driving part and protrudes from the outer surface of the housing, wherein a mounting hole, through which the device driving part and the integrated controller can be vertically mounted or detached together, is formed passing through the one surface of the housing, and the device (Continued)

driving part and the controller can be easily repaired through the mounting hole during maintenance.

12 Claims, 15 Drawing Sheets

(56) References Cited

U.S. PATENT DOCUMENTS

| | | | | |
|---|---|---|---|---|
| 6,503,751 | B2 * | 1/2003 | Hugh | C12M 23/48 219/400 |
| 2006/0148094 | A1 | 7/2006 | Reinhardt | |
| 2023/0250385 | A1 * | 8/2023 | Jochumsen | C12M 41/14 435/303.1 |

FOREIGN PATENT DOCUMENTS

| | | |
|---|---|---|
| KR | 101994123 | 7/2019 |
| KR | 102147960 | 8/2020 |

OTHER PUBLICATIONS

Translation of KR 101669718 B1 (Year: 2016).*
International Search Report Issued in International Application No. PCT/KR2022/018283; Mailed Feb. 23, 2023.
International Written Opinion Issued in International Application No. PCT/KR2022/018283; Mailed Feb. 23, 2023.

* cited by examiner

INCUBATING DEVICE

TECHNICAL FIELD

The present invention relates to an incubating device and, more particularly, to an incubating device able to prevent the conduction of external and internal temperatures, thereby reducing condensation, and to enable internal circulating fluid to be uniformly distributed.

BACKGROUND ART

In general, an artificial incubator is a device for artificially incubating eggs of birds such as chickens, ducks, and other birds, also known as an egg incubator. Such artificial incubators are commonly used for eggs. In poultry farming, artificial incubation is used by placing a number of seed eggs (fertilized eggs) in artificial incubators instead of letting hens brood and hatch fertilized eggs (natural incubation) to increase efficiency.

In addition, artificial incubators are divided into a planar incubator and a three-dimensional incubator, both of which use electrical heat as a heat source to regulate the temperature inside.

The former is generally small, inefficient, and susceptible to the effects of outside temperatures, and thus is not generally used these days. The latter contains a shelf-shaped egg tray (i.e., a footrest on which eggs are placed), a thermostat water bowl, a fan air stirrer, and a hatching egg tray.

The temperature in the artificial incubator may be desirably kept at around 38° C. and the humidity between 60% and 80%.

Generally, in some cases, fertilized eggs are warmed to 21° C. for a few hours before being placed in the incubator. The eggs are rotated four to six times a day to ensure that respective portions of the egg are warmed evenly, during which the eggs are inspected three times. The eggs are transferred to the hatching egg tray on day 18, and maintained to hatch by day 21. In practice, several or more artificial incubators are often collected and managed in one place, and the room temperature of the hatching room or the incubating shed is controlled between 18° C. and 25° C., and the arrangement and lighting are designed to be convenient for various operations.

It is desirable for the artificial incubator to be sufficiently sterilized before and after the eggs are placed therein. Such artificial incubators are disclosed as a variety of examples, among which an "artificial incubator" is disclosed in Patent Document 1 (Korean Registered Utility Model No. 20-0465220). In this artificial incubator, a cover is made of a thin stainless steel, and a plurality of exhaust holes are formed to extend through the surface in an up and down direction, such that hot air may be discharged through the exhaust holes. A heating coil is disposed on the bottom surface of the cover. After a guide is fixed to the cover, a partition plate is disposed on the guide. The heating coil is disposed on the end of the guide, such that heat and water vapor circulated by a fan are discharged through the exhaust holes formed in the partition plate so that the cover is not directly subjected to heat. Water vapor is generated by heating water collected in a reservoir using heat generated by the heating coil to dissipate heat to an egg tray. In this manner, the artificial incubator may advantageously maintain the optimal temperature and humidity for hatching eggs.

However, the "artificial incubator" of the above-mentioned Patent Document 1 has the problem that when the temperature inside the artificial incubator rises, condensation occurs on the outer surface of the artificial incubator due to the temperature difference between the outside and the inside of the artificial incubator, and due to the condensation, the temperature inside the artificial incubator may be lowered.

DISCLOSURE

Technical Problem

It is an object of the present invention to provide an incubating device able to prevent condensation caused by the temperature difference between the inside and the outside by forming a slit in a housing of the incubating device, thereby preventing cold air from entering the incubating device and thus minimizing temperature fluctuations inside the incubating device.

Technical Solution

In order to realize the above objective, the present invention includes: a housing having a predetermined internal space and configured such that one side thereof is configured to be opened and closed; one or more plates provided inside the housing and allowing an object to be placed thereon; a support supporting predetermined ends of the plates and including an egg turning gear configured to transmit rotational force to the plates; a device driver including an egg turning driver mounted to mesh with the egg turning gear to rotate the plates; and a controller configured to operate and control the device driver and protruding from an outer portion of the housing, wherein the one side of the housing has a mounting hole allowing the controller integrally provided with the device driver to be vertically mounted and separated to and from the mounting hole, thereby facilitating maintenance of the device driver and the controller through the mounting hole.

In addition, the housing may include: an outer case having one open side; and a door configured to open and close the one side of the outer case and having a spacing groove between an inner surface and an outer surface.

In addition, the outer case may have discharge slits provided in a surface adjacent to the door and a surface adjacent to the mounting hole.

In addition, the discharge slits may have a predetermined length and include a plurality of discharge slits spaced apart from each other, wherein spaced portions of one or more pairs of the discharge slits intersect each other.

In addition, the housing may further include a coupling case mounted in the mounting hole and having one open side, wherein a heating part is disposed inside the coupling case, and a blower fan is disposed on a side of the coupling case, and the blower fan may be spaced apart from one end of the coupling case, such that heat located in a central portion of the housing is introduced to a separated space of the coupling case and the blower fan.

In addition, the blower fan may be arranged at a predetermined angle, with one side thereof being higher than the other side thereof, to move heat generated by the heating part outward of the housing.

In addition, the incubating device may further include the device driver including a humidifying means disposed inside the housing and configured to control humidity inside the housing.

In addition, the humidifying means may include: a water reservoir configured to reserve and store water; a humidifying water tank configured to receive water from the water reservoir and reserve and store water for humidification of an interior of the housing; a water pump configured to supply water from the water reservoir to the humidifying water tank; a water level control member configured to control a level of water supplied to the humidifying water tank; and a humidifying heater having a portion immersed in water in the humidifying water tank and configured to evaporate water.

In addition, the device driver may include: an egg turning driver mounted to mesh with the egg turning gear and configured to rotate the plates; a detection switch configured to detect an original point of the egg turning gear; and a lamp member configured to provide light into the housing.

In addition, the egg turning driver may include: a drive motor configured to rotate forward and reverse; a first gear connected to the drive motor to rotate forward and reverse following the rotation of the drive motor and including gear teeth on outer circumferential portions; a second gear including teeth on outer circumferential portions to overlap the gear teeth of the first gear and configured to rotate forward and reverse following the rotation of the first gear, a third gear mounted to mesh with the egg turning gear to rotate the egg turning forward and reverse; and a rotating shaft configured to connect the second gear and the third gear and transmit rotational force from the second gear to the third gear.

In addition, the door may include: a pair of door frames spaced apart from each other; sheet portions including a plurality of sheet members disposed inside the door frames; and detachable attaching parts detachably coupled to the door frame and to the sheet portions.

In addition, the incubating device may further include an elastic lock having one side fixed to the outer case and the other side extending toward the door, with a portion of the other side forming a protruding member to protrude toward the door, whereby when the door is closed, the protruding member is fitted into the spacing groove.

Advantageous Effects

The incubating device according to an embodiment of the present invention may have a plurality of slits formed in the outer surface of the housing to prevent condensation caused by a temperature difference between the outside and the inside, thereby preventing cold air generated by relatively low temperatures from entering the incubating device.

In addition, the incubating device according to an embodiment of the present invention may minimize temperature fluctuations inside the hatchery by configuring the blower fan such that the direction thereof is inclined at a predetermined angle to the wall.

Furthermore, the incubating device according to an embodiment of the present invention may neutralize the temperature of heated air by introducing a portion of internal circulating air through the gap between the blower fan and the controller, thereby achieving the effect of uniformizing the temperature inside the incubating device.

BEST MODE

Hereinafter, example embodiments of the present invention will be described in detail with reference to the accompanying drawings.

Advantages and features of the present invention, as well as methods of realizing the same, will be more clearly understood from the following detailed description of embodiments when taken in conjunction with the accompanying drawings.

However, the present invention is not limited to specific embodiments described hereinafter but may be embodied in a variety of different forms. Rather, these embodiments are provided so that the description of the present invention will be complete and will fully convey the scope of the present invention to a person having ordinary skill in the technical field to which the present invention pertains.

In addition, in the following description of the present invention, a detailed description of known technology or the like will be omitted in the situation in which the subject matter of the present invention may be rendered rather unclear thereby.

Figure 1:
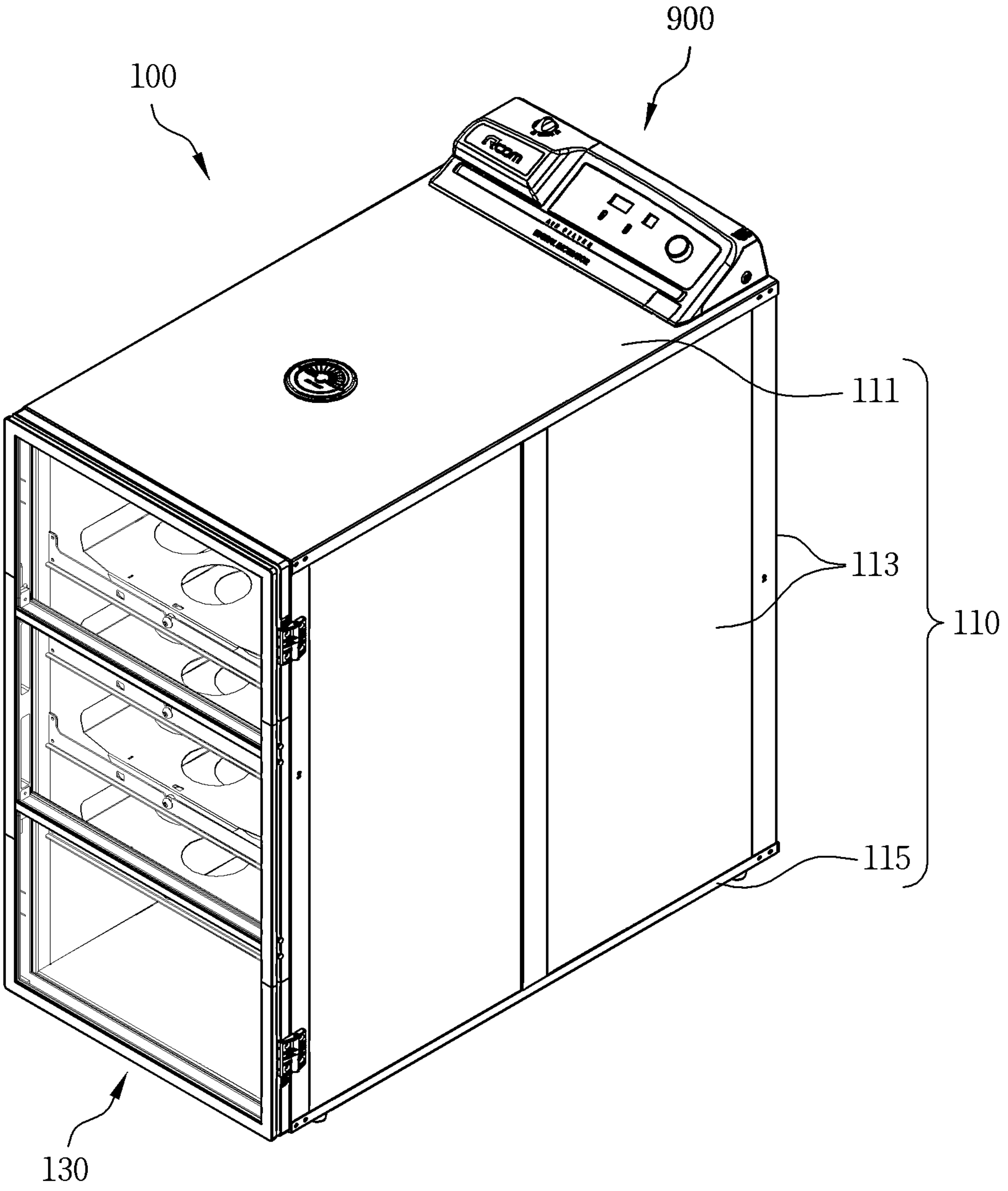
FIG. 1 is a perspective view of an incubating device according to an embodiment of the present invention.
Figure 1A:
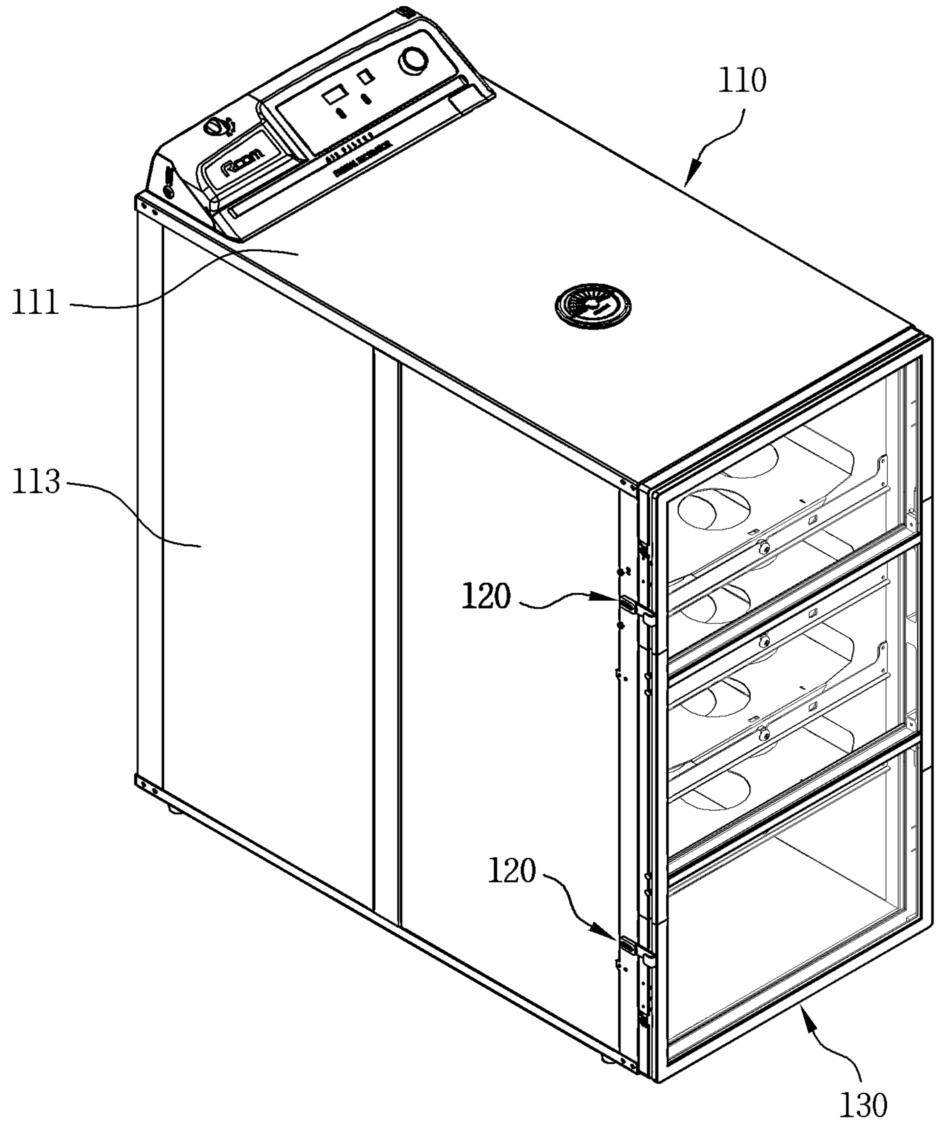
FIG. 1A is a perspective view of FIG. 1 viewed in another angle.
Figure 1B:
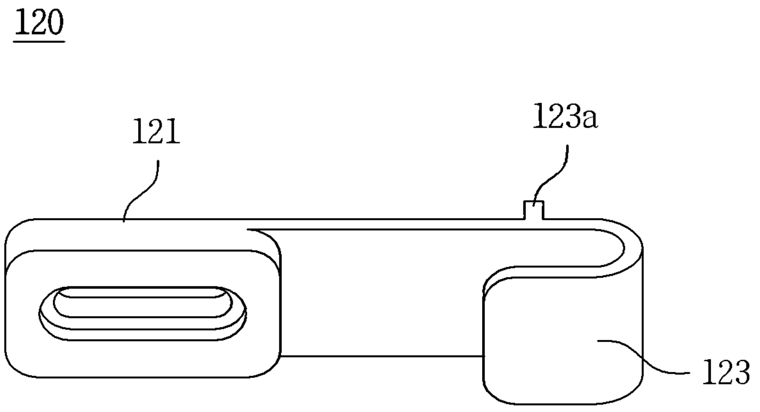
FIG. 1B is a perspective view illustrating an elastic lock shown in FIG. 1A.
Figure 2:
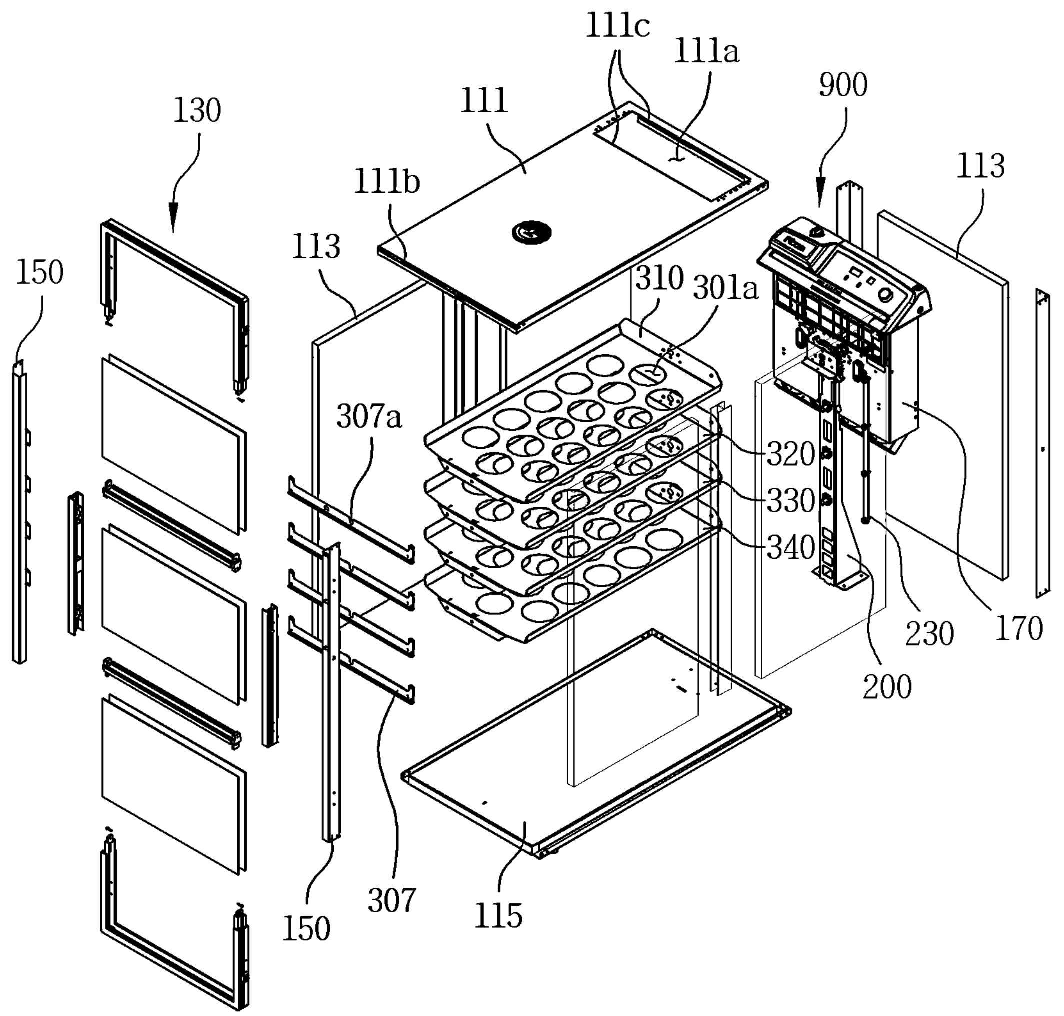
FIG. 2 is an exploded perspective view of the incubating device according to an embodiment of the present invention.
Figure 3:
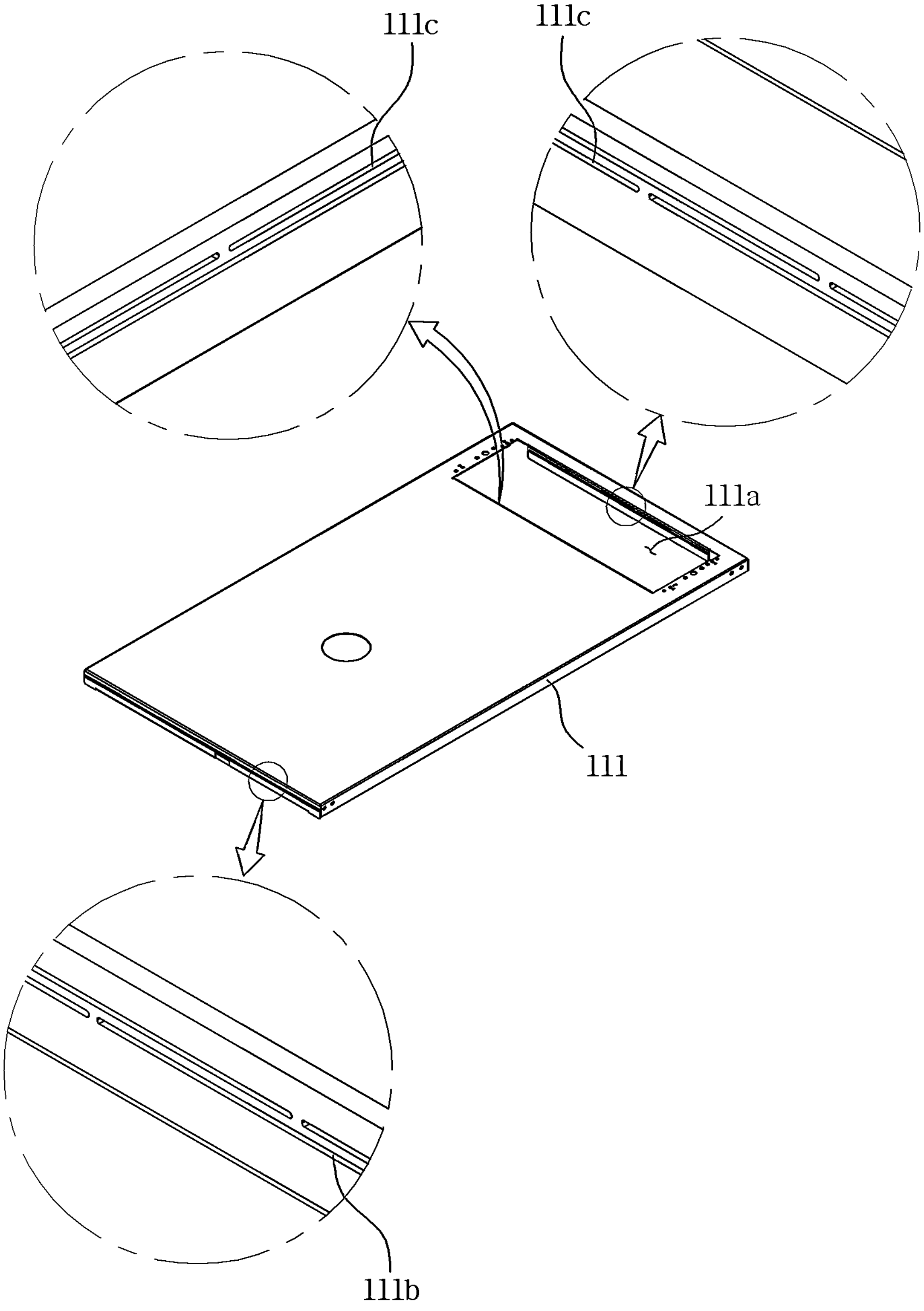
FIG. 3 is an enlarged view illustrating a portion of a housing according to an embodiment of the present invention.
Figure 4:
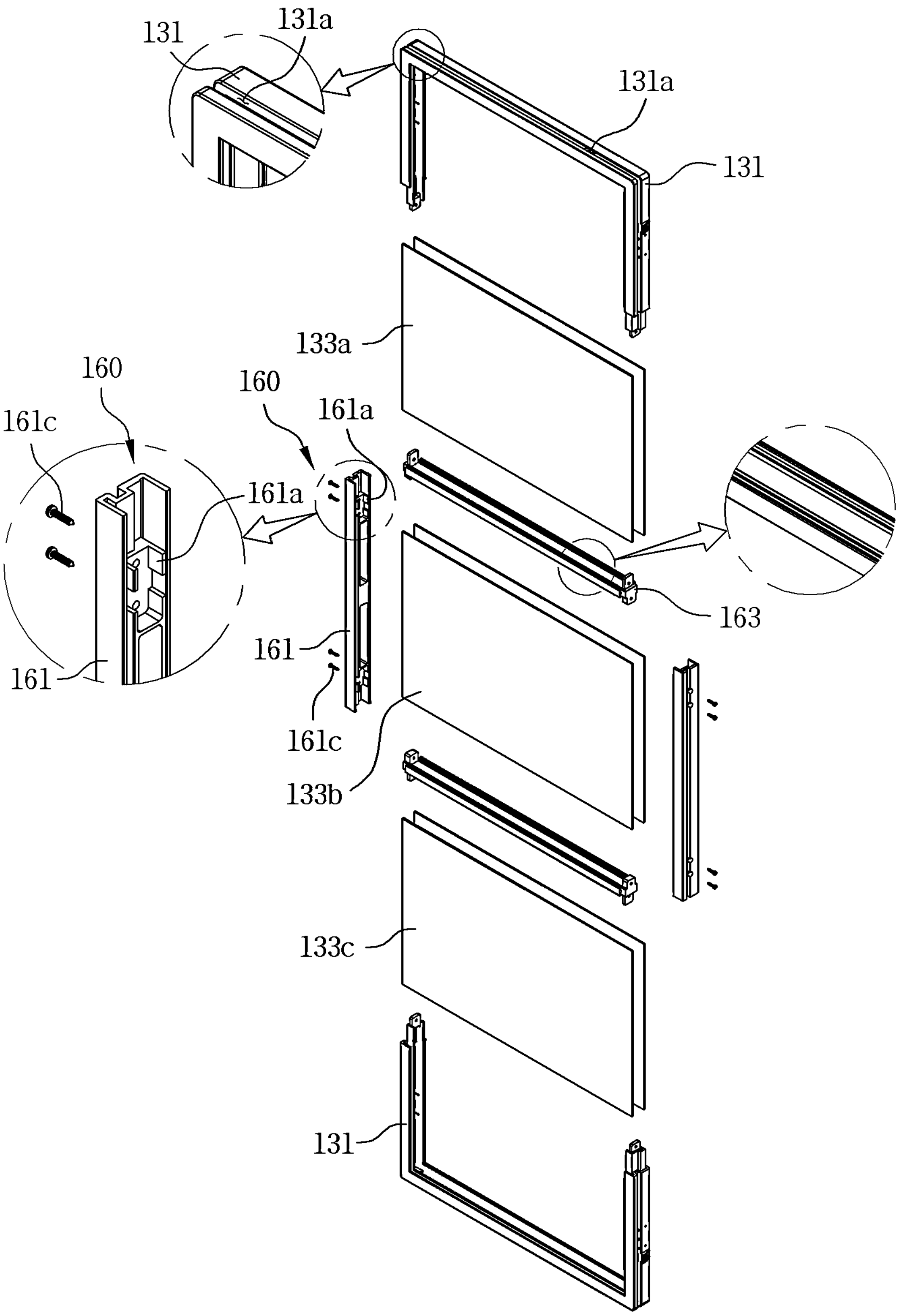
FIG. 4 is an exploded perspective view of the housing according to an embodiment of the present invention.
Figure 5:
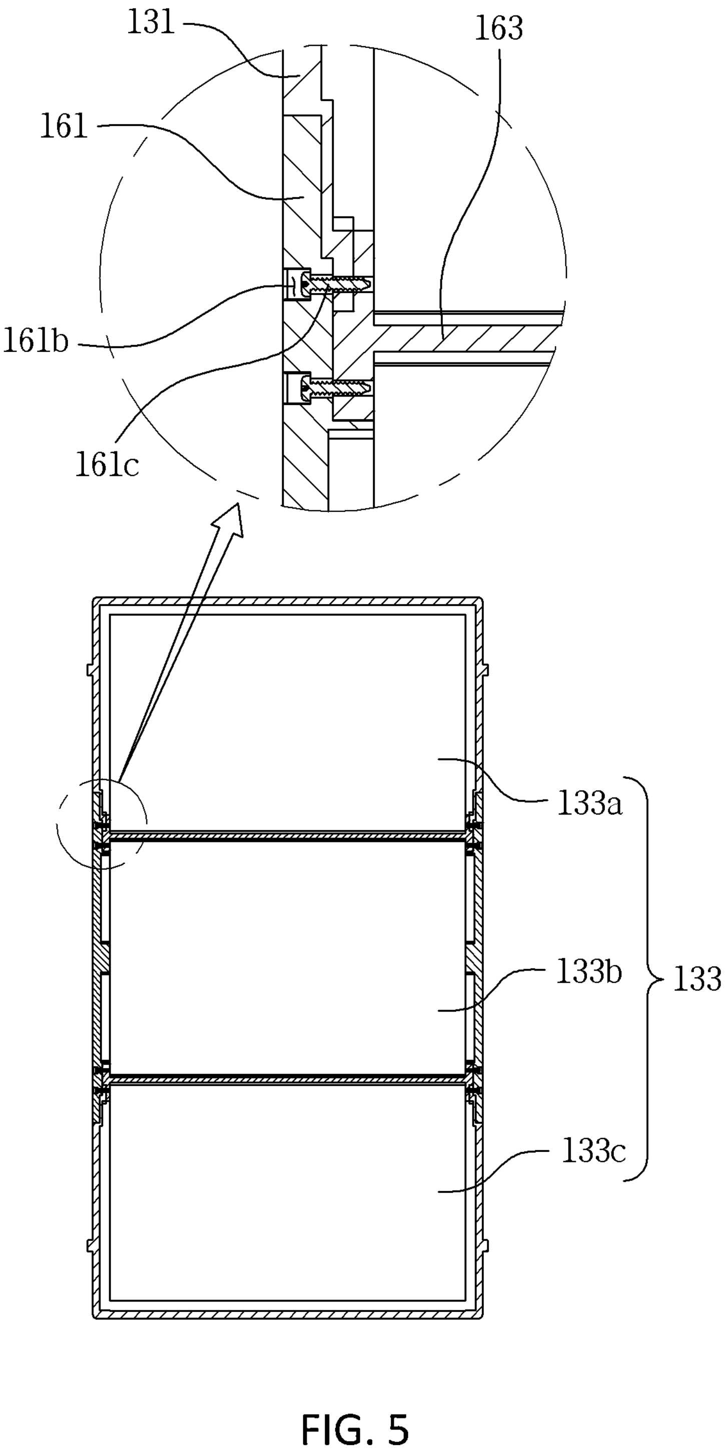
FIG. 5 is a cross-sectional view of the housing according to an embodiment of the present invention.
Figure 6:
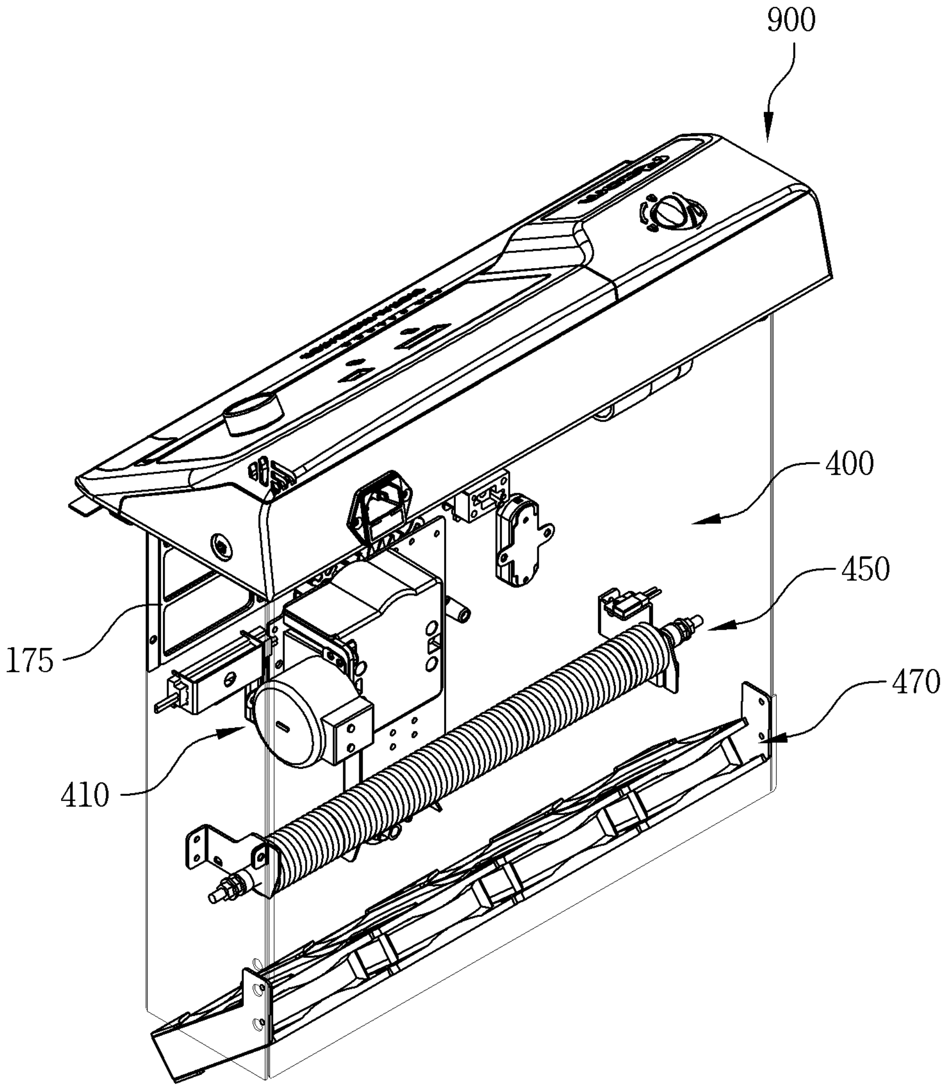
FIG. 6 is a perspective view illustrating the interior of a coupling case according to an embodiment of the present invention.
Figure 7:
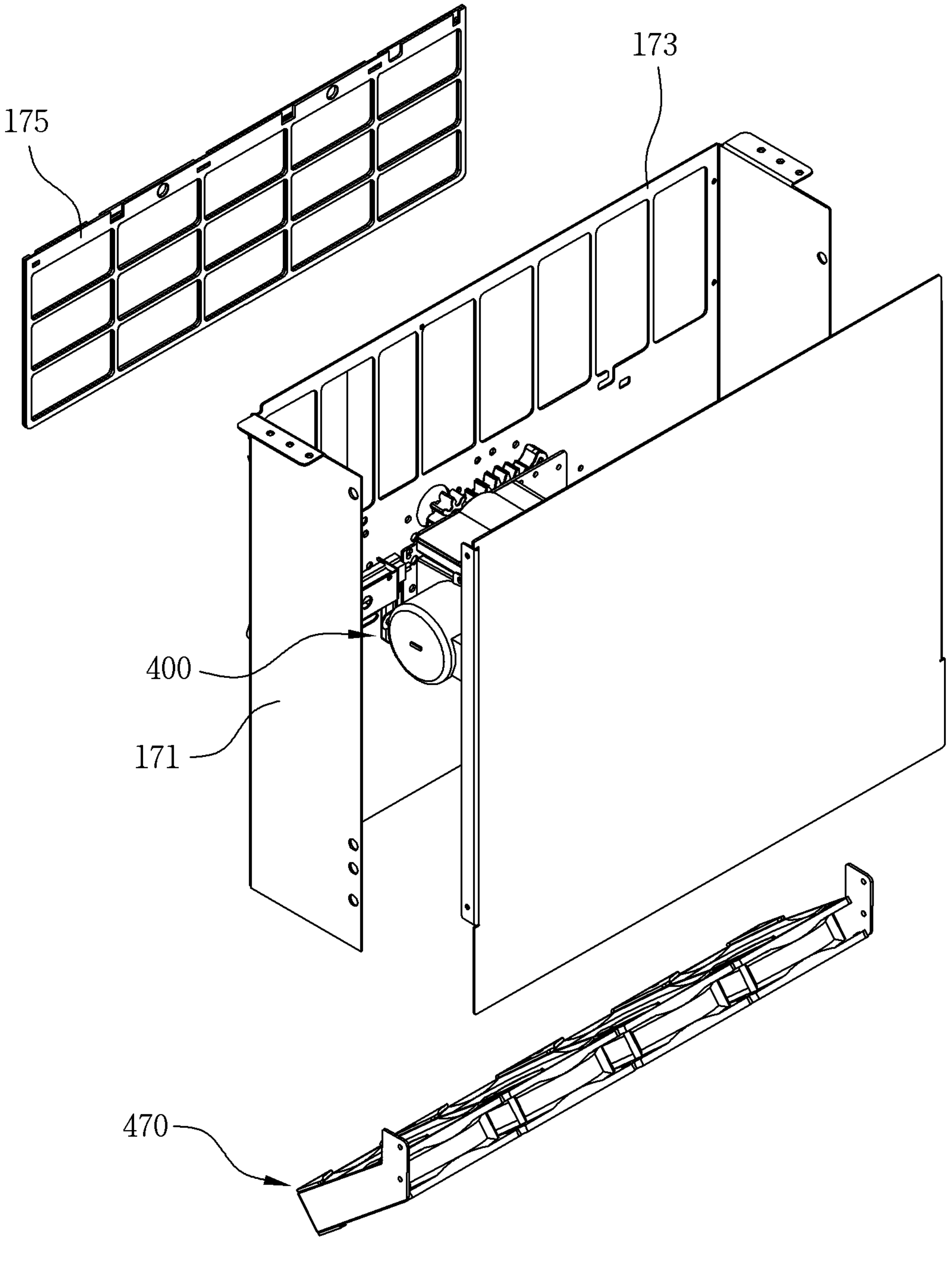
FIG. 7 is an exploded perspective view of the coupling case of the incubating device according to an embodiment of the present invention.

FIG. 1 is a perspective view of an incubating device according to an embodiment of the present invention, FIG. 1A is a perspective view of FIG. 1 viewed in another angle, and FIG. 1B is a perspective view illustrating an elastic lock shown in FIG. 1A, FIG. 2 is an exploded perspective view of the incubating device according to an embodiment of the present invention, FIG. 3 is an enlarged view illustrating a portion of a housing according to an embodiment of the present invention, FIG. 4 is an exploded perspective view of the housing according to an embodiment of the present invention, FIG. 5 is a cross-sectional view of the housing according to an embodiment of the present invention, FIG. 6 is a perspective view illustrating the interior of a coupling case according to an embodiment of the present invention, and FIG. 7 is an exploded perspective view of the coupling case of the incubating device according to an embodiment of the present invention.

Figure 8:
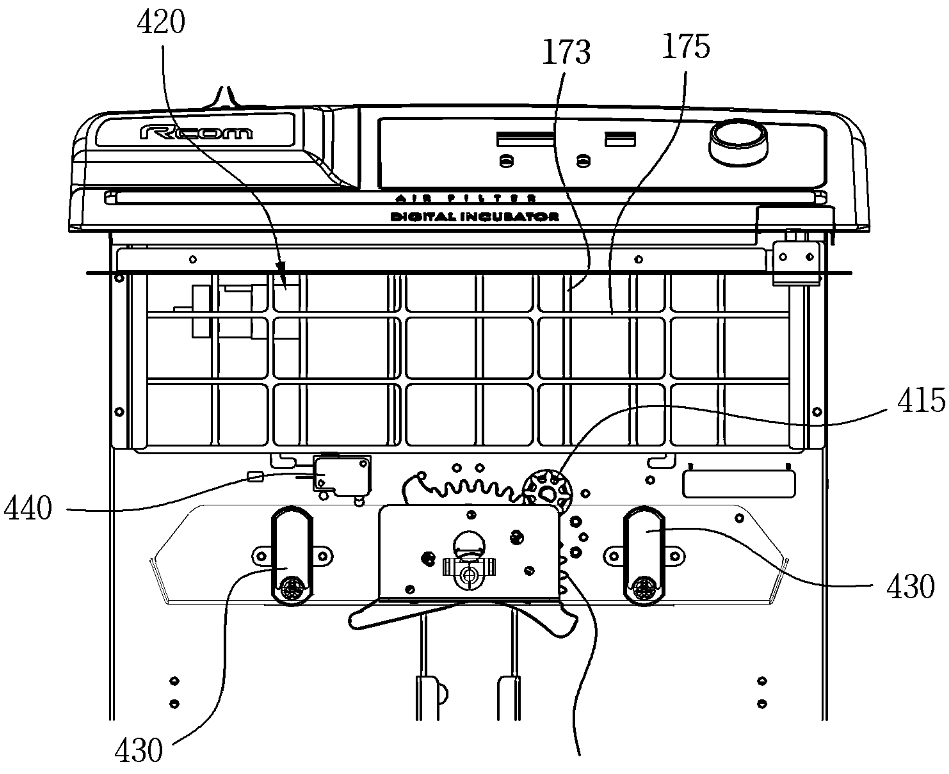
FIG. 8 illustrates the front of the coupling case according to an embodiment of the present invention.
Figure 9:
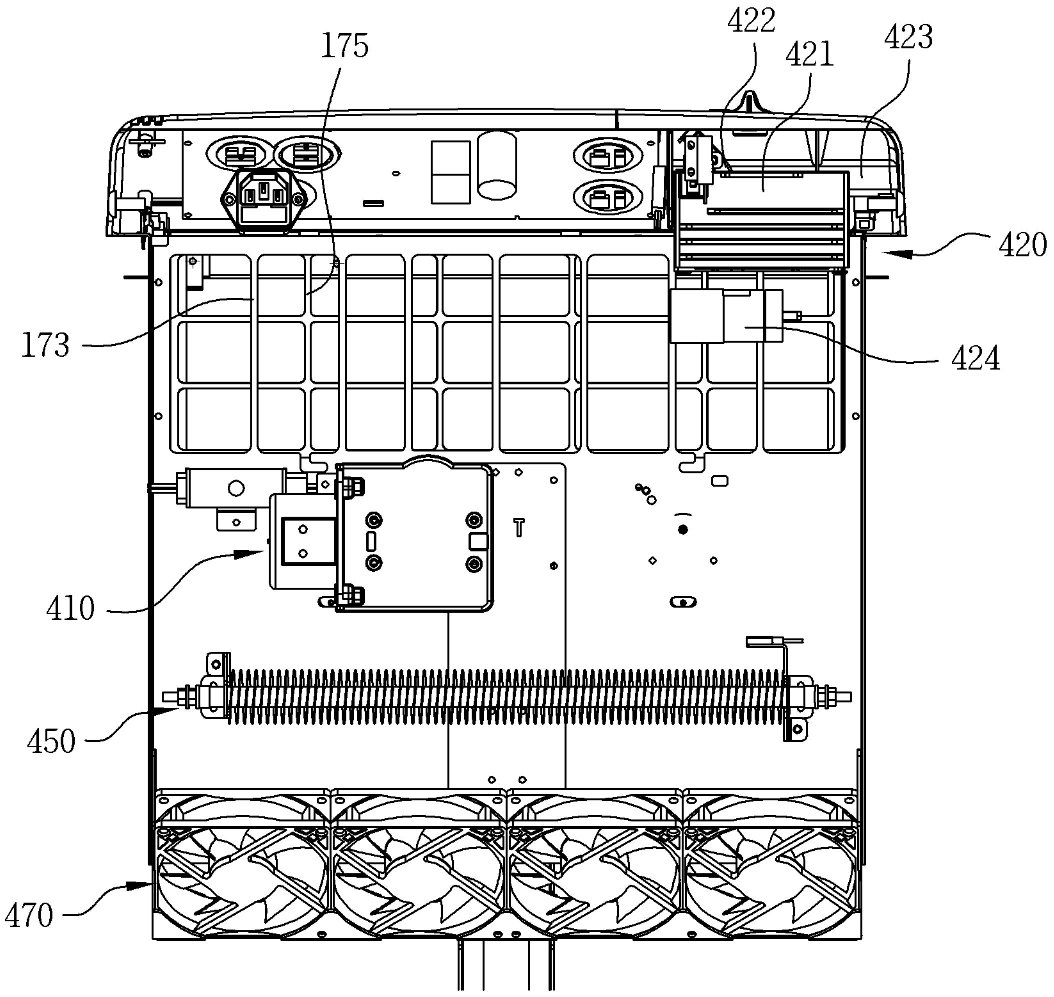
FIG. 9 illustrates a device driver disposed inside the coupling case according to an embodiment of the present invention.

FIG. 8 illustrates the front of the coupling case according to an embodiment of the present invention, and FIG. 9 illustrates a device driver disposed inside the coupling case according to an embodiment of the present invention.

Figure 10:
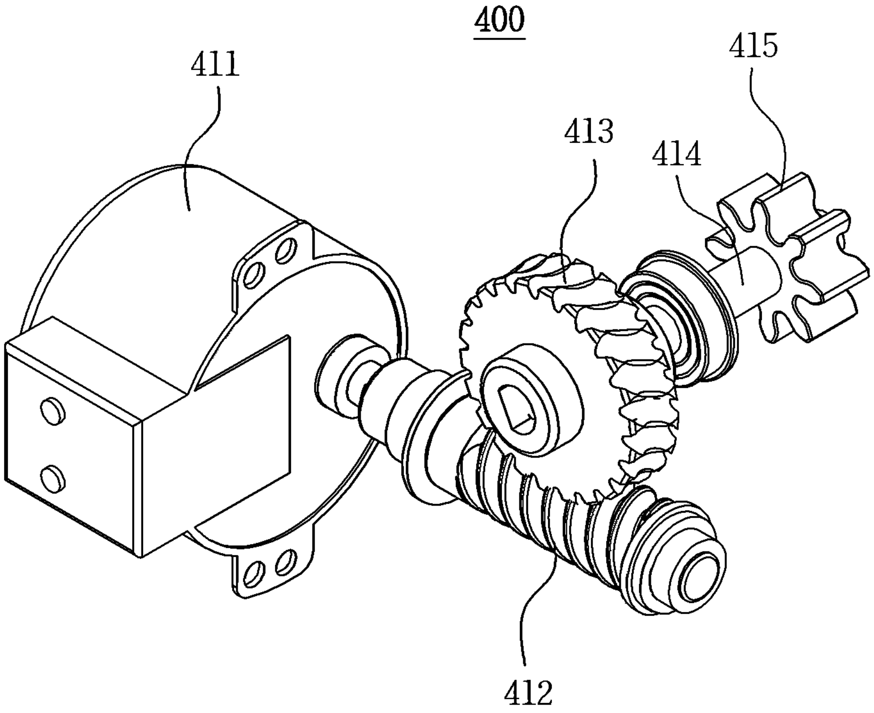
FIG. 10 is a perspective view illustrating an egg turning driver according to an embodiment of the present invention.
Figure 11:
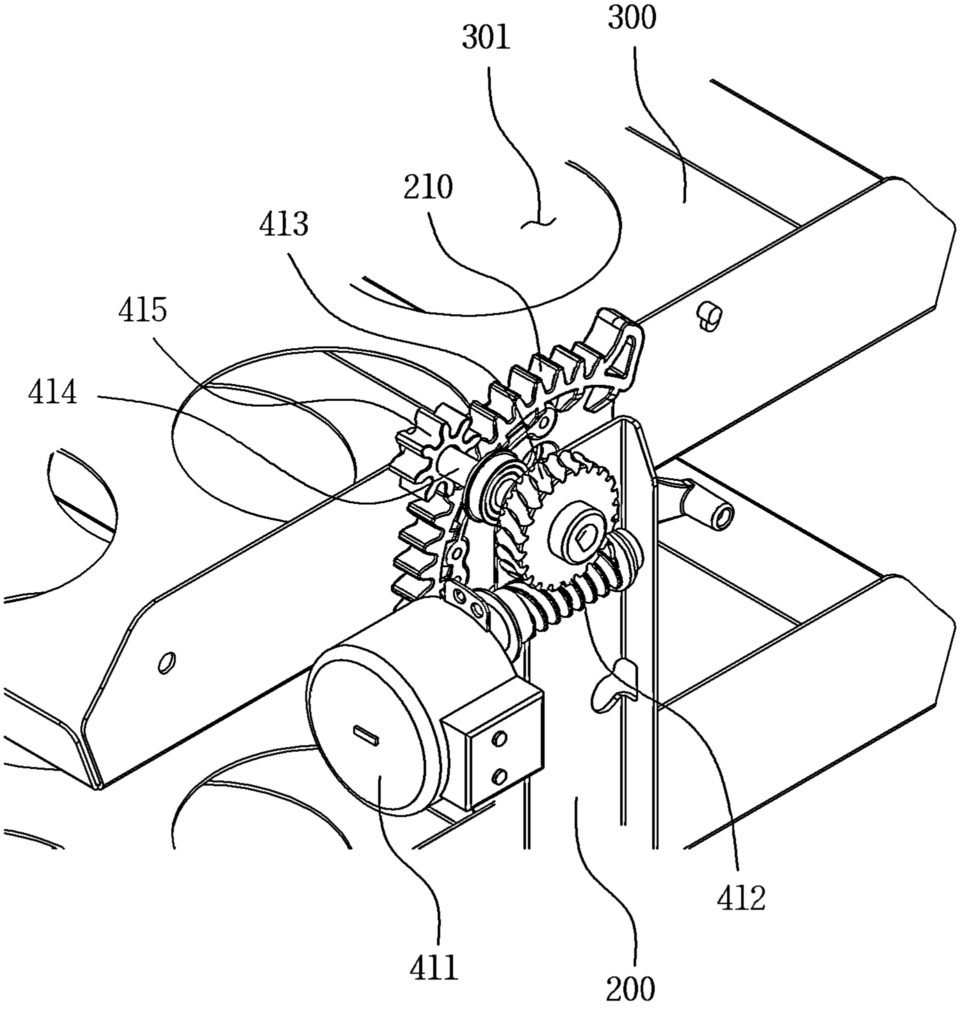
FIG. 11 is an enlarged view illustrating a mounted state of the egg turning driver and egg turning gears according to an embodiment of the present invention.
Figure 12:
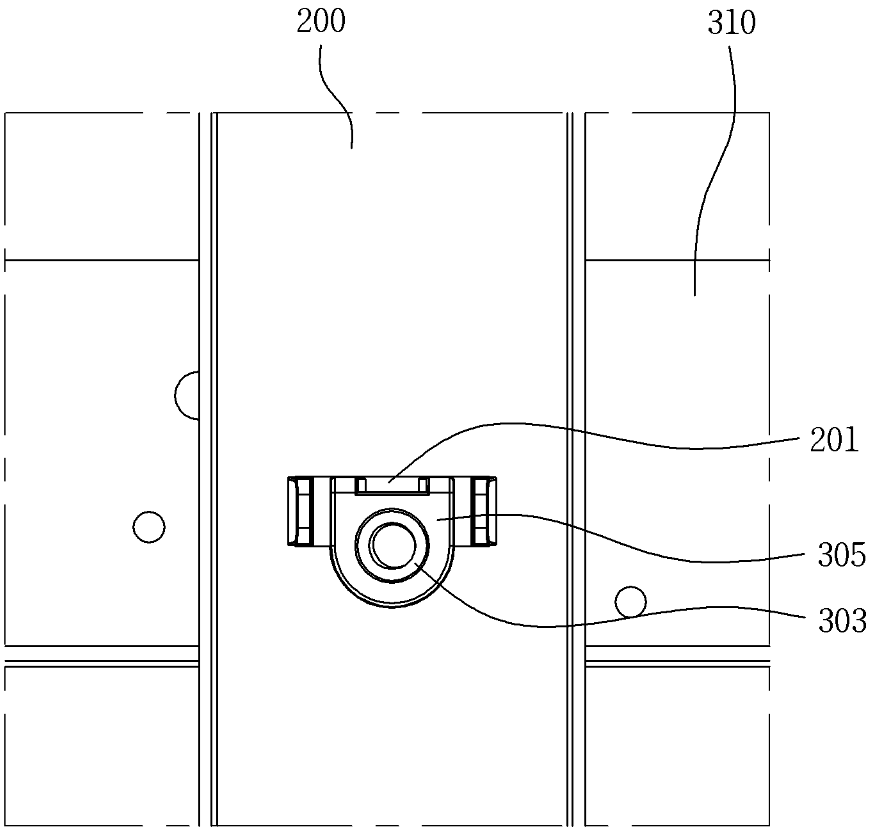
FIG. 12 is an enlarged view illustrating a coupled state of a plate and a support according to an embodiment of the present invention.
Figure 13:
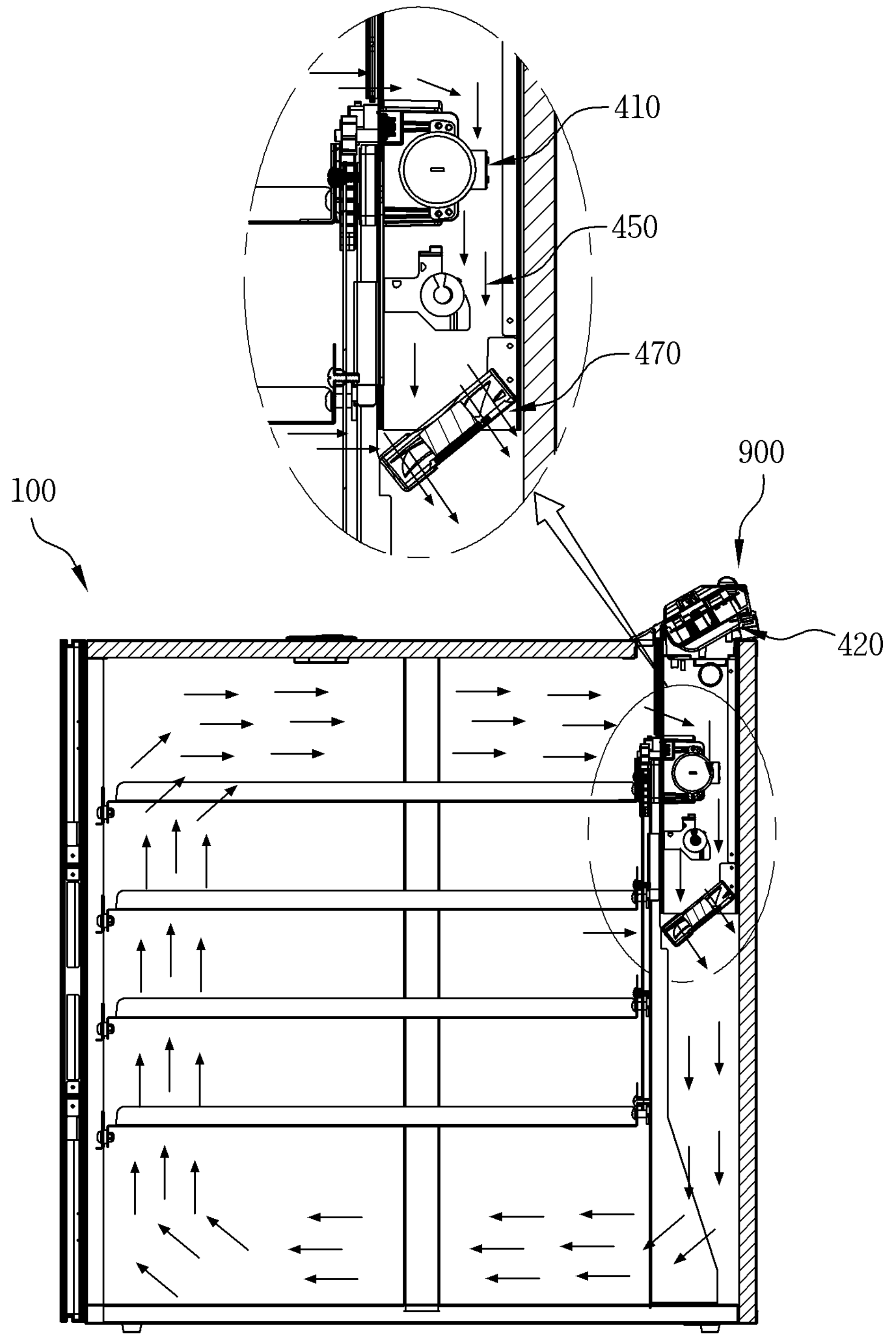
FIG. 13 illustrates airflow inside the incubating device according to an embodiment of the present invention.

FIG. 10 is a perspective view illustrating an egg turning driver according to an embodiment of the present invention, FIG. 11 is an enlarged view illustrating a mounted state of the egg turning driver and egg turning gears according to an embodiment of the present invention, FIG. 12 is an enlarged view illustrating a coupled state of a plate and a support according to an embodiment of the present invention, and FIG. 13 illustrates airflow inside the incubating device according to an embodiment of the present invention.

Referring to FIG. 1, in the following description, a direction from a controller 900 toward a door 130 is described as forward, a direction from the door 130 toward the controller 900 is described as backward, a direction from an upper case portion 111 toward a lower case portion 115 is described as downward, and a direction from the lower case portion 115 toward the upper case portion 111 is described as upward.

Referring to FIGS. 1 to 13, an incubating device 10 according to an embodiment of the present invention may include a housing 100, a support 200, a plate 300, an egg turning driver 410, a heating part 450, a blower fan 470, and the controller 900 in order to prevent the external temperature from being conducted to the internal temperature and to maintain internal temperature deviations to be uniform so that objects therein may be easily incubated.

The housing 100 may include an outer case 110, a door 130, connectors 150, a detachable attaching part 160, and a coupling case 170 to block the conduction of the external temperature to the internal temperature and to allow the plate 300, the egg turning driver 410, the heating part 450, and the blower fan 470 to be disposed therein, the controller 900 to be coupled to an outer surface, and one side to be opened and closed.

The outer case 110 may be formed to have a square cross-section. Furthermore, the outer case 110 may be provided in a shape with an open front side, which may be one side of the outer case 110, while forming an internal space. The outer case 110 may include the upper case portion 111, side case portions 113, and the lower case portion 115 to prevent condensation from forming on the top of the door 130 due to temperature conduction between the inside and the outside.

The upper case portion 111 may be formed to have a rectangular cross-section. For example, the upper case portion 111 may be provided in the shape of a plate. Furthermore, the upper case portion 111 may be spaced apart from the lower surface. In this case, the upper case portion 111 may be connected to the side case portions 113, which will be described later, so that the upper case portion 111 is disposed at a distance from the lower surface.

In addition, the upper case portion 111 may have a mounting hole 111*a* having a square cross-section formed in a rear portion. The mounting hole 111*a* is coupled to the coupling case 170 described later, and the controller 900 is coupled to the upper surface of the coupling case 170. The controller 900 may control the egg turning driver 410, the heating part 450, and the blower fan 470 disposed inside the coupling case 170.

In addition, the upper case portion 111 may prevent fluid, which may be internal temperature or air, from escaping upward.

At this time, due to the difference between the internal temperature and the external temperature, the upper case portion 111 may be provided with a first discharge slit 111*b* and a second discharge slit 111*c* to prevent condensation, which will be described later, from forming on a portion where the door 130 and the upper case portion 111 are connected.

Referring to FIGS. 2 and 3, the first discharge slit 111*b* may be formed in a forward end of the upper case portion 111. In this case, the front end of the upper case portion 111 may be formed to protrude downward. Furthermore, the first discharge slit 111*b* may be provided in a downwardly protruding side of the upper case portion 111.

In addition, the first discharge slit 111*b* may be a hole extending in a left-to-right direction, which may be in the width of the upper case portion 111. Furthermore, the first discharge slit 111*b* may be provided as a plurality of slits. This may reduce the conduction of heat between the inside and the outside of the upper case portion 111.

In addition, the front and rear surfaces of the mounting hole 111*a* formed in the rear portion of the upper case portion 111 may be provided with downwardly protruding portions. Furthermore, a plurality of second discharge slits 111*e* may be provided on the downwardly protruding surfaces.

The second discharge slits 111*e* may be formed to have the same shape as the first discharge slits 111*b* described above. That is, the second discharge slits 111*e* may extend longitudinally in either side of the downwardly projecting portion and may be formed in plurality.

In addition, the protruding surface in which the first discharge slits 111*b* are provided and the protruding surface in which the second discharge slits 111*c* are provided may be formed at the same height. In this case, a separate member may be disposed between the protruding surface in which the first discharge slits 111*b* are provided and the protruding surface in which the second discharge slits 111*c* are provided.

In this case, the downwardly extending side case portions 113 may be coupled to outer surfaces of the upper case portion 111.

The side case portions 113 may be provided as a plurality of side case portions to close the left, right, and rear sides of the upper case portion 111. Furthermore, the side case portions 113 may be formed to have a square cross-section.

In addition, the right-located side case 113 may be rotatably connected to the door 130, for example, by hinges or the like such that the door 130 is connected to the right-located side case 113.

In addition, elastic locks 120 may be coupled to the left side surface of the side case portions 113 to improve the closing force when the door 130 is closed. For example, in a closed state where the door 130 is connected to the outer case 110, the elastic locks 120 disposed on the left side of the outer case 110 may allow the door 130 to be more firmly and airtightly closed.

Referring to FIGS. 1A and 1B, each of the elastic locks 120 may be screwed with the side case portions 113 located on the left side, and may include an elastic body 121, an elastic member 123, and a protruding member 123*a*, which may facilitate sealing with the door 130.

By screwing the rear end of the elastic member 123, which has a certain elastic force, with the side case portion 113, the elastic body 121 may fix the rear end of the elastic lock 120.

In addition, the resilient member 123 may protrude forward of the resilient body 121, with the forward end thereof being bent to the left and backward, thereby forming a "⊏" shape. With this configuration, the end of the elastic member 123 may be easily gripped, thereby allowing the elastic member 123 to be easily released from the door 130.

The protruding member 123*a* may protrude from an outer surface of the elastic member 123. In this case, the protruding member 123*a* may be fitted into a spacing groove 131*a* of the door 130. Due to the protruding member 123*a* being inserted into the spacing groove 131*a*, the elastic lock 120 may fix the side case portion 113 and the door 130.

In this manner, the elastic lock 120 may allow the objects, which may be hatching objects, to be easily received into or removed from the inside of the housing 100.

In addition, each of the side case portions 113 may be provided in multiple stages. For example, the side case portion 113 may be formed by jointing two plates together.

In this case, the lower case portion 115 may be coupled to the bottom ends of the downwardly extending side case portions 113 to connect the side case portions 113, and may be formed to have the same size as the upper case portion 111.

The lower case portion 115 may form a lower surface of the housing 100. Furthermore, the lower case portion 115 may be formed to have a square cross-section.

As described above, the internal space with an open front side may the defined by the upper case portion 111, the side case portions 113, and the lower case portion 115.

In this case, the front open portions of the upper case portion 111, the side case portions 113, and the lower case portion 115 may be coupled to the door 130 by which the front portion of the housing 100 may be opened and closed.

The door 130 may be formed to have a square cross-section. Furthermore, the door 130 may include door frames 131 and sheet portions 133 to prevent condensation from occurring at the top of the open front portion of the housing 100 and to enable opening and closing of the front portion of the door 130, and may include the connectors 150 and the detachable attaching part 160 to couple the door frames 131 and the sheet portions 133.

The door frames 131 may be provided in a "⊏" shape. Furthermore, the door frames 131 may be formed in a pair, and may be disposed on the top and the bottom. Furthermore, the door frames 131 may be configured such that the protruding portions of the "⊏" shape face each other. In this case, the door frames 131 located at an upper position and the door frames 131 located at a lower position may be coupled by the detachable attaching part 160, which will be described later.

In addition, surfaces of the door frames 131 formed on the front end and the rear end may have the same height, and a spacing groove 131*a* may be provided between the front end surface and the rear end surface.

That is, the spacing groove 131*a* may be formed between the front end and the rear end by setting a lower height between the front end and the rear end of each door frame 131. Accordingly, the conductivity of heat between the front end and the rear end of the door frame 131 may be reduced, thereby reducing the temperature conduction between the inside of the housing 100 disposed at the rear of the door frame 131 and the outside in front of the door frame 131.

This may prevent condensation from forming on the front portion of the door frame 131 or on the top portion of the sheet portions 133 described later. In this case, a plurality of sheet portions 133 may be joined between the pair of door frames 131.

The sheet portions 133 may be formed to have a square cross-section. Furthermore, the sheet portions 133 may be made of glass, PC, ABS, or the like. Furthermore, the sheet portions 133 may be made of a transparent material. In addition, the sheet portions 133 may be formed of a plurality of stages. In this case, the plurality of stages may be first sheet members 133*a*, second sheet members 133*b*, and third sheet members 133*c*.

In addition, the sheet portions 133 may be arranged such that a pair thereof are provided at each stage. In this case, the pair of sheet portions 133 may be disposed in forward and backward portions inside each of the door frames 131.

For example, the first sheet members 133 may be disposed on the inner portion of the upper door frame 131. Furthermore, the third sheet members 133*c* may be disposed on the inner portion of the lower door frame 131. In this case, the second sheet members 133*b* may be disposed between the first sheet members 133*a* and the third sheet members 133*c*, and the connectors 150 and the detachable attaching part 160 may be disposed on the sides of the second sheet members 133*b* such that the second sheet members 133*b* are attachable to and detachable from the first sheet members 133*a* and the third sheet members 133*c*.

Each of the connectors 150 may be formed to have a square cross-section. Furthermore, the connectors 150 may be provided as a plurality of connectors. Furthermore, the connectors 150 may be disposed on the front sides and the rear sides of the side case portions 113.

For example, the connectors 150 may be provided as four connectors. Furthermore, the connectors 150 may be disposed to extend downward from the corners of the upper case portion 111 to the lower case portion 115 to connect the upper case portion 111, the lower case portion 115, and the side case portions 113 disposed between the upper case portion 111 and the lower case portion 115.

The connectors 150 may be connected to the front sides and the rear sides of the side case portions 113 to couple the upper case portion 111, the side case portions 113, and the lower case portion 115. In addition, the connectors 150 may be coupled to the front portion of the housing 100 by a rotatable coupler (not shown) coupled to the outer surfaces thereof, such that the door 130 may be opened by rotating the rotatable coupler.

In this case, the detachable attaching part 160 may be coupled to the connectors 150 and the sheet portions 133 such that the plurality of sheet portions 133 may be coupled to the connectors 150 located on the sides of the door 130 and extending up and down.

For example, the detachable attaching part 160 may be coupled to forwardly protruding portions of the connectors 150. Furthermore, the detachable attaching part 160 may extend upward and downward. In addition, the upper portion of the detachable attaching part 160 may couple the lower portions of the first sheet members 133*a* and the connectors 150, the lower portion of the detachable attaching part 160 may couple the third sheet members 133*c* and the connectors 150, and the middle portions of the detachable attaching parts 160 may be coupled to the left and right sides of the second sheet members 133*b*.

In this case, each of the detachable attaching part 160 may include vertical members 161 and horizontal members 163 configured to detachably attach the first sheet members 133*a*, the second sheet members 133*b*, and the third sheet members 133*c* to the connectors 150 and to facilitate attachment and detachment between the first sheet members 133*a*, the second sheet members 133*b*, and the third sheet members 133*c*.

Each of the vertical members 161 may be formed to have a square cross-section. Furthermore, the vertical member 161 may be grooved inward, thereby forming a "⊏" shape. Furthermore, the vertical members 161 may be provided in a pair. In this case, the protruding portions of the vertical members 161 may be configured such that the pair of vertical members 161 face each other.

In addition, the vertical members 161 may extend upward and downward. Furthermore, each of the vertical members 161 may have two or more detachable bodies 161*a* coupled to the inner portions thereof. Each of the detachable bodies 161*a* may be provided in a "⊏" shape, and may be formed to have a size smaller than the vertical member 161 and may be coupled to an inward groove of the vertical member 161.

In addition, the detachable body 161*a* may be coupled to the upper and lower portions of the second sheet members 133*b*. Furthermore, the detachable body 161*a* may have insertion holes 161*b* formed in the central portion. Accordingly, when the detachable body 161*a* having the insertion holes 161*b* formed therein is coupled to the vertical member 161 and the corresponding horizontal member 163 described later is placed in a line corresponding to the position where the insertion hole 161*b* of the detachable body 161*a* is formed, the screw 161*c* may be coupled to the inner portion of the insertion hole 161*b*, and the vertical members 161 and the horizontal members 163 may be coupled.

Each of the horizontal members 163 may include a horizontal body 163*a* having an engagement groove 163*b* formed therein, such that the horizontal members 163 may be coupled to the vertical members 161 while in a state of being coupled to the plurality of sheet portions 133.

The horizontal bodies 163*a* may be provided in a pair. Furthermore, the upper horizontal body 163*a* may couple the bottom portions of the first sheet members 133*a* to the top portions of the second sheet member 133*b*. Furthermore, the lower horizontal body 163*a* may couple the bottom portions of the second sheet members 133*b* to the top portions of the third sheet members 133*c*.

In addition, each of the horizontal bodies 163*a* may extend in a direction in which the plurality of sheet portions 133 extend from left to right. Furthermore, each of the horizontal members 163 may have an "H" shaped cross-section which is opened upward and downward.

In addition, each of the horizontal bodies 163*a* may have plates on the left end and the right end, each of which has a square cross-section and protrudes upward and downward. Threaded holes (not shown) are formed at positions of the plates corresponding to the plurality of insertion holes 161*b* described above. Accordingly, when the screws 161*c* may be engaged with the threaded holes by passing through the insertion holes 161*b*, thereby coupling the vertical members 161 and the horizontal members 163.

In addition, portions of the horizontal body 163*a* may protrude to form grooves, each having a shape corresponding to the thickness of the corresponding sheet portion 133 which may extend from the front to the back.

In this case, the protruding portions may be two or more portions, and a groove may be formed between the protruding portions. In this manner, the plurality of sheet portions 133 provided in pairs may be joined.

For example, two grooves may be formed in the upper portion of the upper horizontal body 163*a*, and the bottom portions of the pair of first sheet members 133*a* may be coupled thereto. That is, the two grooves may be coupled to the pair of first sheet members 133*a* such that the first sheet members 133*a* are spaced apart from each other. In this case, the top portions of the first sheet members 133*a* may be coupled to the lower portion of the upper door frame 131.

In addition, two grooves may be formed in the lower portion of the upper horizontal body 163*a*, and the pair of second sheet members 133*b* may be coupled thereto. That is, the two grooves may be coupled to the pair of second sheet members 133*b* such that the second sheet members 133*b* are spaced apart from each other.

Furthermore, two grooves may be formed in the upper portion of the lower horizontal body 163*a*, and the bottom portions of the pair of second sheet members 133*b* may be coupled thereto. That is, the two grooves may be coupled to the pair of second sheet members 133*b* such that the second sheet members 133*b* are spaced apart from each other.

In addition, two grooves may be formed in the lower portion of the lower horizontal body 163*a*, and the top portions of the pair of third sheet members 133*c* may be coupled thereto. That is, the two grooves may be coupled to the pair of third sheet members 133*c* such that the third sheet members 133*c* are spaced apart from each other.

In this case, the bottom portions of the third sheet members 133*c* may be coupled to the upper portion of the lower door frame 131. Accordingly, each pair of sheet members 133*a*, 133*b*, or 133*c* may be spaced apart from other pairs, thereby effectively blocking heat conduction.

The coupling case 170 may include an inner case 171, a coupling plate 173, and an additional plate 175 such that the support 200, the egg turning driver 410, the heating part 450, and the blower fan 470 may be disposed inside the housing 100.

The inner case 171 may be formed to have a square cross-section. Furthermore, the inner case 171 may be shaped such that the bottom is open. Furthermore, the inner case 171 may be provided in a shape corresponding to the mounting hole 111*a* formed in the upper case portion 111, such that the inner case 171 may be coupled to the mounting hole 111*a* of the upper case portion 111.

At this time, the controller 900 may be disposed on top of the inner case 171, thereby allowing a user to control the egg turning driver 410, the heating part 450, and the blower fan 470 coupled to the inner portions of the inner case 171.

In addition, left and right protrusions may be provided on the top of the inner case 171. The protrusions of the inner case 171 may be provided between the upper case portion 111 and the side case portions 113. The protrusions may be coupled to the upper case portion 111 and the side case portions 113 using screws or the like, thereby being firmly fixed thereto. Furthermore, the inner case 171 may be easily removed from the mounting hole 111*a* by gripping the protrusions of the inner case 171. Accordingly, the inner case 171 may be easily separated from other components coupled to the inner case 171.

In addition, the coupling plate 173 may be provided on the front portion of the inner case 171. The coupling plate 173 may have a plurality of holes formed therein, through which internal fluid of the housing 100 may move into the inner case 171.

In this case, an additional plate 175 may be coupled to the front portion of the coupling plate 173 to further divide the plurality of holes of the coupling plate 173. Accordingly, fluid inside the housing 100 may easily flow into the inner case 171. In this case, the support 200 may be coupled to the front surface of the inner case 171, at positions below the coupling plate 173 and the additional plate 175. In other words, the coupling plate 173 and the additional plate 175 form a heat sink, by which the fluid may be moved into the coupling case 170.

The support 200 may be formed to have a square cross-section. Furthermore, the support 200 may be formed to extend in a direction from the top to the bottom. Furthermore, the support 200 may be provided with a plurality of holes, through which the plate 300 may be coupled.

For example, the support 200 is formed to extend in the vertical direction, and a support hole 201 is formed in one side of the support 200. In this case, the support hole 201 is a hole formed to support one side of the plate 300, and since a fixed protrusion 303 of the plate 300 is inserted through the support hole 201, one side of the plate 300 may be supported on the support 200.

In addition, the support holes 201 may be provided as a plurality of support holes formed in an up and down direction of the support 200 and spaced apart from each other so that any one of a plurality of plates, such as a first plate 310 to a fourth plate 340, may be supported on the support 200.

Here, it is desirable to further provide a guide member 305 below the support hole 201 to allow the fixed protrusion 303 of the plate 300 to rotate smoothly.

In addition, the support 200 may be provided with a worm wheel-shaped egg turning gear 210 having teeth on the outer circumferential surface. The egg turning gear 210 is connected to the egg turning driver 410 of the device driver 400 described later, and may be a gear configured to rotate the plate 300 for egg turning of an object.

In addition, the egg turning gear 210 may be coupled to any one of the plates 300 to allow the plate 300 to rotate to the left or right.

In addition, a plurality of plates 300 are provided inside the housing 100 of the incubating device 10 of the present invention, and a transmission member 230 extending in an up and down direction may be provided on predetermined sides of the plurality of plates 300 so as to be spaced apart from the support 200.

The transmission member 230 may be a member connecting one of the plates 300 coupled to the egg turning gear 210 and the remaining plates 300 to transmit rotational force so that when one plate 300 is rotated by the egg turning gear 210, the remaining plates 300 may also rotate.

In addition, it is desirable for the transmission member 230 to be hingedly coupled to the predetermined sides of the plurality of plates 300 to ensure smooth rotation.

In this case, the top portion of the support 200 may be coupled to the inner case 171, and the bottom portion of the support 200 may be coupled to the upper surface of the lower case portion 115. The plates 300 may be coupled to the holes formed in the support 200. Accordingly, the support 200 may couple the inner case 171, the plates 300, and the housing 100.

The plates 300 may be provided in the shape of a plate. Furthermore, the plates 300 may be provided with a plurality of holes, and objects, such as eggs, may be seated in the plurality of holes. In addition, the plurality of plates 300 may include a first plate 310, a second plate 320, a third plate 330, and a fourth plate 340.

In this case, the front ends of the plates 300 may be coupled to fixing members 307 configured to connect the pair of connectors 150, located in front of the housing 100, to each other.

The fixing members 307 may extend inside the housing 100 in a direction parallel to the longitudinal direction of the support 200.

In addition, the fixing members 307 may support the other sides of the plates 300 opposite the sides supported by the support 200. The fixing members 307 extend in the horizontal direction, and on the upper surfaces of the fixing members 307, fixing grooves 307*a* for supporting the other sides of the plates 300 are recessed in up and down directions.

In this case, since the fixing grooves 307*a* are formed and the fixed protrusions 303 of the plates 300 are inserted into the fixing grooves 307*a*, the other sides of the plates 300 may be supported by the fixing members 307. Furthermore, it is desirable for the fixing grooves 307*a* to be formed at the same center point as the support holes 201 to prevent the plates 300 from tilting to any side.

In this case, it is desirable that the fixing members 307 having the fixing grooves 307*a* are formed in the same number as the number of the support holes 201 formed in the support 200, so that the support holes 201 and the fixing grooves 307*a* are formed at mutually corresponding positions, and the guide member 305 is further provided below the fixing grooves 307*a* to enable the fixed protrusions 303 of the plates 300 to rotate smoothly. Accordingly, the plates 300 may be firmly supported and smoothly rotated by the support 200 and the fixing members 307.

In addition, the rear ends of the plates 300 may be coupled to the support 200. Here, the rear ends of the plates 300 may be formed to protrude upwardly, and holes may be formed in the upwardly protruding portions, respectively. Accordingly, the plates 300 may be coupled to the support 200 by a shaft extending through the holes.

In this case, the shaft of the first plate 310 may be connected to the egg turning driver 410 located inside the inner case 171 through the support 200. Accordingly, the first plate 310 may be rotated by driving the egg turning driver 410.

In addition, the first plate 310, the second plate 320, the third plate 330, and the fourth plate 340 are coupled to the transmission member 230 connecting the first plate 310 to the second plate 320, the third plate 330, and the fourth plate 340 inside the support 200 extending in the up and down direction, so that rotation of the first plate 310 may cause the other plates to rotate simultaneously.

In addition, the device driver 400 may be disposed inside the coupling case 170. The device driver 400 may include the egg turning driver 410, a humidifying means 420, a power supply 430, a control switch 440, the heating part 450, and the blower fan 470.

The egg turning driver 410 may be disposed to be coupled to the support 200 and the first plate 310 to rotate the plates 300. The heating part 450 may be disposed below the egg turning driver 410 so as to be spaced apart from the egg turning driver 410. Below the heating part 450, the blower fan 470 may be coupled to the coupling case 170 which is open downward.

In addition, the controller 900 may be coupled to the upper surface of the coupling case 170, and the humidifying means 420 may be coupled to a surface facing the inner case 171 to provide moisture into the housing 100, in which the surface may be opposite the controller 900.

In addition, the egg turning driver 410 may include a drive motor 411, a first gear 412, a second gear 413, a rotating shaft 414, and a third gear 415 to rotate the plates 300, with the egg turning driver 410 being disposed therein.

The first gear 412 and the second gear 413 may be a worm gear and a worm wheel used in common. The first gear 412 and the second gear 413 may be configured such that the axes of rotation thereof are orthogonal to each other.

In addition, the first gear 412 is connected to the drive motor 411 so as to rotate following the rotation of the drive motor 411. The second gear 413 mounted to mesh with the teeth of the first gear 412 may rotate following the rotation of the first gear 412.

In addition, the third gear 415 may be a worm gear mounted to mesh with the teeth of the egg turning gear 210. The third gear 415 may be connected to the second gear 413 so as to rotate together following the rotation of the second gear 413.

In this case, the center of rotation of the second gear 413 and the center of rotation of the third gear 415 are connected by the rotating shaft 414. Accordingly, the third gear 415 may receive the rotational force of the second gear 413 through the rotation shaft 414 to rotate together.

In other words, in the egg turning driver 410, when the first gear 412 is rotated due to the operation of the drive motor 411, the second gear 413 orthogonal to the first gear 412 may be caused to rotate, and the rotational force may be transmitted to the third gear 415 through the rotating shaft 414 connected to the third gear 415, thereby causing the egg turning gear 210 to rotate.

In addition, the third gear 415 may be mounted to mesh with the teeth of the egg turning gear 210 so as to rotate the egg turning gear 210 by the rotational force of the second gear 413. Furthermore, the first to fourth plates 310, 320, 330, and 340 coupled to the egg turning gear 210 are rotated to the left and right following the rotation of the egg turning gear 210. At this time, the transmission member 230 may cause all the plates 300 to perform the same rotation together.

Further, the humidifying means 420 may be disposed above the egg turning driver 410 so as to be spaced apart from the egg turning driver 410.

The humidifying means 420 is a means for humidifying the interior of the housing 100, and may include a water tank 421, a water level control member 422, a humidifying heater 423, and a water pump 424.

The water tank 421 is a tank configured to reserve and store water for humidifying the interior of the housing 100.

In this case, the water tank 421 receives water from a water reservoir (not shown) disposed outside the housing 100. The water tank 421 may be connected to the water reservoir through a hose to receive water therefrom. In addition, the hose connecting the water tank 421 and the water reservoir may be connected to the water pump 424.

The water pump 424 is a device that injects water reserved and stored in the water reservoir into the water tank 421 by pumping. The water pump 424 is also provided with an inlet through which water enters the water pump 424 and an outlet through which water is injected from the water pump 424 into the water tank 421. Accordingly, water reserved and stored in the water reservoir may be injected into the water tank 421 by pumping the water pump 424.

The water level control member 422 and a reed switch (not shown) are provided inside the water tank 421. The water level control member 422 and the reed switch are members configured to detect the water level of water injected into the water tank 421.

The water level control member 422 is a commonly known float switch having a magnet on one end thereof. A reed switch configured to be magnetically actuated is provided on one side of the water level control member 422.

Here, the reed switch is desirably mounted at the maximum level of water contained in the water tank 421. In addition, the reed switch actuated by the magnet may serve to power off the humidifying means 420 when the cover of the high-temperature humidifying means 420 on the controller 900 is opened by a user while the hatching apparatus of the present invention is in operation.

Accordingly, when water in the water tank 421 fills up and the magnet of the water level control member 422 floats to the surface of water, the reed switch is magnetically actuated by the magnet of the water level control member 422 to sense the level of water in the water tank 421.

In this manner, the water pump 424 is operated in response to the magnetic action of the water level control member 422 and the reed switch. In addition, water stored in the water reservoir is injected into the water tank 421 in response to the operation of the water pump 424, thereby automatically supplying water to the water tank 421.

The humidifying heater 423 is housed inside the water tank 421. The humidifying heater 423 is a heater configured to reduce the amount of current by itself to maintain a proper temperature. The humidifying heater 423 may be immersed in water in the water tank 421 to evaporate water by heating the same.

Water vapor generated by the humidifying heater 423 is introduced into the housing 100 to perform humidification.

In addition, a lamp member (not shown) may be disposed inside the coupling case 170 adjacent to the drive motor. The lamp member may provide light into the housing 100 so that a user may conveniently check the conditions of hatching objects inside the housing 100 from outside.

A power supply 430 connected to the controller 900 by signal lines and the control switch 440 are further provided inside the coupling case 170.

The power supply 430 is provided with a power supply configured to supply power to the humidifying means 420 and a power supply configured to supply power to the egg turning driver 410.

The power supply 430 may be connected to the controller 900 by signal lines to provide power to the controller 900 in response to the operation of the controller 900 and in accordance with settings set by the user, thereby enabling the humidifying means 420 and the egg turning driver 410 to be driven.

In addition, the control switch 440 configured to adjust egg turning angles of the plates 300 may be further provided inside the coupling case 170.

The control switch 440 is configured to originate the plates 300 rotated by the egg turning gear 210. The control switch 440 of the present invention is implemented as a microswitch.

Such a control switch 440 implemented as a microswitch may manipulate a prescribed rotational motion of the plate 300 with a prescribed force.

In addition, the rotating shaft 414 of the egg turning driver 410 may be provided inside the coupling case 170 to extend through the coupling case 170.

In addition, the heating part 450 may be disposed below the egg turning driver 410 so as to be spaced apart from the same. The heating part 450 may provide heat to control the internal temperature. In this case, the heating part 450 may be implemented as a coil heater or a sheath heater.

In addition, the blower fan 470 may be disposed below the heating part 450 so as to be spaced apart from the heating part 450. The blower fan 470 may be coupled to the coupling case 170 and configured to dissipate heat generated in the heating part 450 downwardly from the coupling case 170.

The blower fan 470 may be disposed to be inclined at a predetermined angle to ensure that water vapor and heat are uniformly supplied into the housing 100.

For example, the rear end of the blower fan 470 may be coupled to a surface formed on a side of the inner case 171. Furthermore, the blower fan 470 may be disposed at the rear of the inner case 171.

In addition, the front end of the blower fan 470 may be disposed such that the front end is located below the rear end. In this case, the front end of the blower fan 470 may be disposed below the surface formed in front of the inner case 171 so as to be spaced apart from the bottom portion of the inner case 171.

Accordingly, fluid, which may be a gas formed of, for example, air inside the housing 100, may enter the front of the blower fan 470 inclined at the predetermined angle and exit the rear of the blower fan 470.

Referring to FIG. 8, fluid, which may be a gas formed of, for example, air, may cause internally heated fluid to move to the front surface, which may be the upper surface of the blower fan 470, and then toward the inner surface of the housing 100, which may be the rear surface of the blower fan 470.

In this case, the blower fan 470 is configured to be inclined at the predetermined angle, such that the front end of the blower fan 470 may be spaced apart from the bottom portion of the inner case 171.

Accordingly, a portion of the internally circulating fluid that is formed inside the housing 100 and has not passed through the heating portion 450 may be introduced to the front of the blower fan 470, so that a portion of fluid that has not moved through the blower fan 470 may move to the blower fan 470.

For example, fluid may be heated by the heating part 450 disposed inside the inner case 171 and moved to the housing 100 by the blower fan 470 so as to move along the inner surface of the housing 100. In this case, the movement of fluid located in the central portion of the housing 100 may be slower than the movement of fluid adjacent to the inner surface of the housing 100.

In this case, fluid located in the central portion of the housing 100 may be introduced into the space spaced apart from the inner case 171 due to the inclined blower fan 470, thereby facilitating the circulation of fluid inside the housing 100 and minimizing the temperature deviation inside the housing 100.

Accordingly, eggs or other objects, which may be located inside, receive heat uniformly and hatch consistently.

Although the present invention has been described with reference to the exemplary embodiment(s) illustrated in the drawings, it will be apparent to a person having ordinary skill in the art that the embodiments are provided for illustrative purposes only, and that various modifications and alterations can be made without departing from the spirit and scope of the present invention. It should also be understood that the entirety or some of the foregoing embodiments may be selectively combined. Accordingly, the true scope and spirit of the present invention shall be defined only by the appended claims.

| | |
|---|---|
| 10: incubating device | 100: housing |
| 110: outer case | 111: upper case portion |
| 111a: mounting hole | 111b: first discharge slit |
| 111c: second discharge slit | 113: side case portion |
| 115: lower case portion | 130: door |
| 131: door frame | 131a: spacing groove |
| 133: sheet portion | |
| 133a: first sheet member | 133b: second sheet member |
| 133c: third sheet member | 150: connector |
| 160: detachable attaching part | 161: vertical member |

-continued

| | |
|---|---|
| 161a: detachable body | 161b: insertion hole |
| 161c: screw | 163: horizontal member |
| 163a: horizontal body | 163b: engagement groove |
| 170: coupling case | 171: inner case |
| 173: coupling plate | 175: additional plate |
| 200: support | 201: support hole |
| 210: egg turning gear | |
| 300: plate | 301: seatig hole |
| 303: fixed protrusion | 305: guide member |
| 307: fixing member | |
| 310: first plate | 320: second plate |
| 330: third plate | 340: fourth plate |
| 400: device driver | 410: egg turning driver |
| 411: drive motor | 412: first gear |
| 413: second gear | 414: rotating shaft |
| 415: third gear | |
| 420: humidifying means | 421: water tank |
| 422: water level control member | 423: humidifying heater |
| 424: water pump | |
| 430: power supply | 440: control switch |
| 450: heating part | 470: blower fan |
| 900: controller | |

The invention claimed is:

1. An incubating device comprising:

a housing having a predetermined internal space and configured such that one side of the housing is configured to be opened and closed, the housing comprising a coupling case;

one or more plates provided inside the housing and allowing an object to be placed thereon;

a support supporting a respective predetermined end of each of the one or more plates, and comprising an egg turning gear configured to transmit rotational force to the plates;

a device driver comprising an egg turning driver mounted to mesh with the egg turning gear to rotate the plates; and a controller connected to the device driver, configured to operate and control the device driver, and protruding from an outer portion of the housing, wherein the one side of the housing has a mounting hole allowing the controller and device driver to be vertically mounted and separated to and from the mounting hole, thereby facilitating maintenance of the device driver and the controller through the mounting hole;

wherein the coupling case is mounted in the mounting hole and has one open side, wherein a heating part is disposed inside the coupling case, and a blower fan is disposed on a side of the coupling case; and wherein the blower fan is spaced apart from one end of the coupling case, such that heat located in a central part of the housing is introduced to a separated space of the coupling case and the blower fan.

2. The incubating device of claim 1, wherein the housing comprises:

an outer case having one open side; and a door configured to open and close the one open side of the outer case and having a spacing groove between an inner surface and an outer surface.

3. The incubating device of claim 2, wherein the outer case has discharge slits provided in a surface adjacent to the door and a surface adjacent to the mounting hole.

4. The incubating device of claim 3, wherein the discharge slits have a predetermined length and comprise a plurality of discharge slits spaced apart from each other, wherein spaced portions of one or more pairs of the discharge slits intersect each other.

5. The incubating device of claim 1, wherein the blower fan is arranged at a predetermined angle, with one side thereof being higher than the other side thereof, to move heat generated by the heating part outward of the housing.

6. The incubating device of claim 1, further comprising:

the device driver comprising a humidifying means disposed inside the housing and configured to control humidity inside the housing.

7. The incubating device of claim 6, wherein the humidifying means comprises:

a humidifying water tank configured to receive water and reserve and store water for humidification of an interior of the housing;

a water pump configured to supply water to the humidifying water tank;

a water level control member configured to control a level of water supplied to the humidifying water tank; and a humidifying heater having a portion immersed in water in the humidifying water tank and configured to evaporate water.

8. The incubating device of claim 7, wherein the device driver comprises:

an egg turning driver mounted to mesh with the egg turning gear and configured to rotate the plates.

9. The incubating device of claim 8, wherein the egg turning driver comprises:

a drive motor configured to rotate forward and reverse;

a first gear connected to the drive motor to rotate forward and reverse following the rotation of the drive motor and comprising gear teeth on outer circumferential portions;

a second gear comprising teeth on outer circumferential portions to overlap the gear teeth of the first gear and configured to rotate forward and reverse following the rotation of the first gear;

a third gear mounted to mesh with the egg turning gear to rotate the egg turning forward and reverse; and a rotating shaft configured to connect the second gear and the third gear and transmit rotational force from the second gear to the third gear.

10. The incubating device of claim 2, wherein the door comprises:

a pair of door frames spaced apart from each other;

sheet portions comprising a plurality of sheet members disposed inside the door frames; and detachable attaching parts detachably coupled to the door frame and to the sheet portions.

11. The incubating device of claim 2, further comprising an elastic lock having one side fixed to the outer case and another side extending toward the door, with a portion of the another side forming a protruding member to protrude toward the door, whereby when the door is closed, the protruding member is fitted into the spacing groove.

12. The incubating device of claim 1, wherein the controller is integral with the device driver.

* * * * *